May 11, 1937.  E. H. LAND  2,079,621
DEVICE FOR USE IN ILLUMINATING SYSTEMS EMPLOYING POLARIZED LIGHT
Filed Aug. 27, 1935
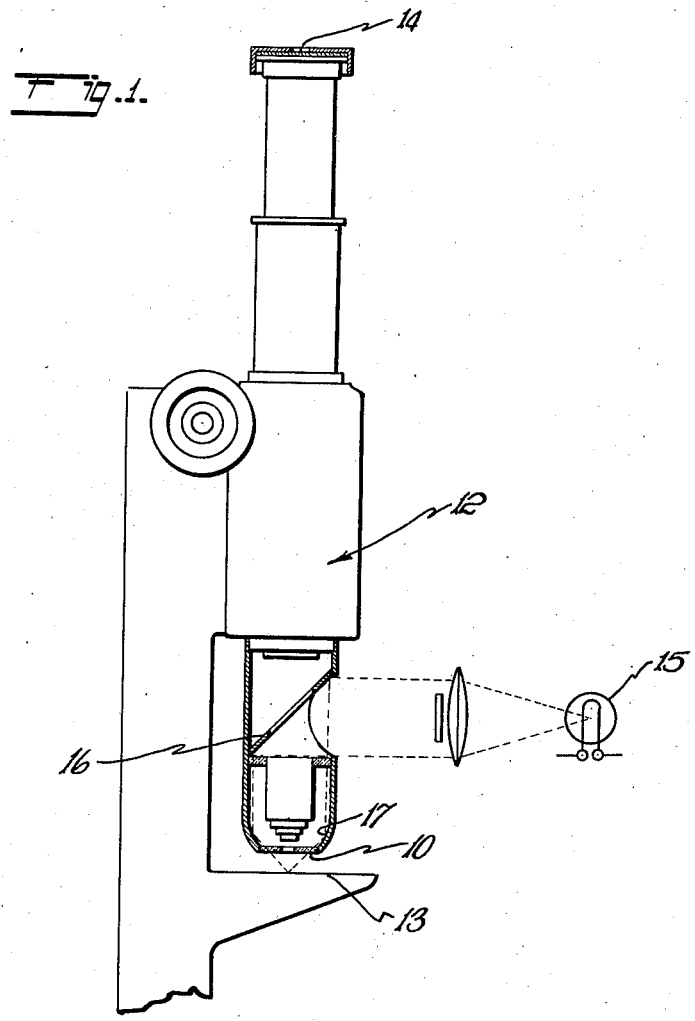
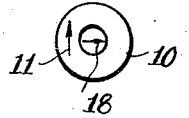
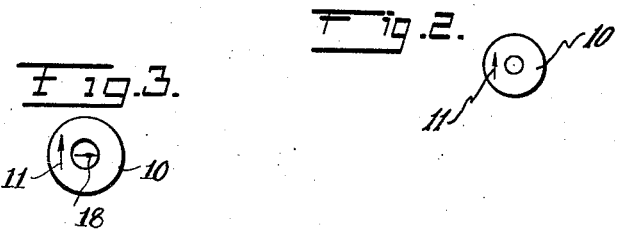
INVENTOR
Edwin H. Land
BY
Donald L. Brown
ATTORNEY Patented May 11, 1937

2,079,621

UNITED STATES PATENT OFFICE 2,079,621

DEVICE FOR USE IN ILLUMINATING SYSTEMS EMPLOYING POLARIZED LIGHT

Edwin H. Land, Wellesley Farms, Mass., assignor to Sheet Polarizer Company, Inc., Union City, N. J., a corporation of New Jersey Application August 27, 1935, Serial No. 38,088

6 Claims. (Cl. 88—40)

This invention relates to new and improved devices for use in illuminating systems and more particularly systems employing polarized light.

An object of the invention is to provide polarizing and analyzing elements for use in devices of the type known as dark field opaque illuminators and the like wherein the object to be viewed is illuminated by a ring of light brought to a focus and is viewed by light reflected back from the object up through the ring-like illuminating beam.

A further object of the invention is to provide a ring-like polarizer for use in connection with a ring-like beam and to provide an analyzer cooperating with said polarizer and so positioned as to permit an object to be viewed through the aperture in said polarizer.

A still further object of the invention is to provide a ring-like polarizer attachment for use above the stage of a dark field opaque illuminator to uniformly polarize light illuminating the object on the stage and to provide an analyzer adapted to permit viewing the object through the aperture in said ring-like polarizer.

Other objects of the invention will in part be obvious and will in part appear hereinafter.

The invention accordingly comprises the features of construction, combination of elements and arrangement of parts which will be exemplified in a construction hereinafter set forth and the scope of the application of which will be indicated in the claims.

For a fuller understanding of the nature and objects of the invention reference should be had to the following detailed description taken in connection with the accompanying drawing, in which:

Figure 1 is a view in elevation, with parts broken away and portions shown somewhat diagrammatically, of a dark field opaque illuminator equipped with an embodiment of the invention;

Fig. 2 is a plan view of the ring-like polarizing element of the invention; and

Fig. 3 is a plan view of an analyzer in the plane of the ring-like polarizing element.

Heretofore no practical method of building a polarizing dark field opaque illuminator has been devised. These dark field illuminators were primarily intended to reduce to a minimum glare from the surface of the object viewed. They do not, however, completely eliminate such glare and it has been found desirable to polarize the beam impinging upon the object and to view the object through an analyzer.

This invention contemplates the use of a ring-like, preferably unitary, polarizing element positioned to intersect the ring-like beam illuminating the object and provided with an adequate aperture, for example in the centre of the polarizing element, so that light reflected from the object may be transmitted to the eye piece of the device therethrough.

Sheet polarizers made by suspending a mass of minute oriented polarizing particles in a set suspending medium such as those recently made available have been found adaptable for the purpose of this invention. They may be readily cut or die stamped into any desired shape, for example the ring-like shape here preferred. Furthermore these polarizing sheets are of the necessary thinness for use in structures embodying this invention. In dark field opaque illuminators for example the space for insertion of the polarizer above the stage is not more than a few millimeters in width. Incidentally if polarizers of this type are employed the portion cut from the ring-like polarizer to form the aperture therein may be effectively employed as the cooperating analyzer without wastage.

It is to be understood that the analyzer is ordinarily positioned with its plane of polarization at right angles to the plane of polarization of the ring-like polarizer so as to block light reflected from the object viewed which has not become depolarized. It will be obvious that the analyzer may be rotatably mounted with respect to the ring-like polarizer.

While the device has been described as functioning with dark field opaque illuminators it is to be understood that its use is not so limited. For example devices embodying the invention may be employed wherever a circular ring-like illuminator is employed and the object illuminated viewed through the aperture in the illuminator polarizing ring. The device may lend itself admirably to large viewing devices where a plurality of light sources are mounted peripherally about a viewing aperture through which the object or objects illuminated are to be viewed.

In the embodiment of the invention shown in the drawing 10 is illustrative of the ring-like element employed as a polarizer, the arrow 11 indicates the position of the polarizing axis of the element. In Fig. 1 the element is shown mounted in a microscope 12 above the stage 13 so as to polarize the ring-like beam illuminating an object on the stage. The polarizing element should be positioned so as to intersect the illuminating beam after its final reflection and before it impinges on the stage in order that no ellipticity may be introduced into the polarized beam. The analyzer 14 is shown positioned with its polarizing axis at right angles to the polarizing axis of the ring-like polarizer 10.

In operation light from the source 15 impinges upon the mirror 16 and is directed downwardly in the form of a ring. It strikes the polished inner surface of the element 17, traverses the ring-like polarizing element 10 and is polarized thereby and then impinges upon the stage 13 where the object viewed is held. The light is then reflected back from the object through the aperture in the polarizer 10, to the eye piece of the microscope and traverses the analyzer 14 which acts to block that portion of the reflected light which is not depolarized. It is to be understood that the analyzer may, if desired, be positioned within the aperture in the ring-like polarizer. Such a device is illustrated in Fig. 3, wherein the arrows 11 and 18 represent the polarizing axes of the polarizer and analyzer respectively.

Since certain changes may be made in the above article and different embodiments of the invention could be made without departing from the scope thereof it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention what I claim as new and desire to secure as Letters Patent is:

1. In combination, a source of illumination providing a ring-like beam, a light polarizing element shaped and positioned to intercept said beam and to provide an aperture within the ring formed by said beam, means to cause said beam to impinge upon an object, and an analyzer comprising a light polarizing element positioned to intercept beams traversing said ring-like polarizer and impinging upon said object and reflected therefrom so as to traverse the aperture in said ring-like polarizer.

2. In combination a thin unitary ring-like polarizing element having an aperture therein and positioned to polarize a ring-like beam, means adapted to cause a beam traversing said polarizing element to be reflected through the aperture therein, and an analyzer positioned to intercept said beam and having its plane of polarization positioned at substantially right angles to the plane of polarization of said ring-like polarizer.

3. In an optical device means to provide a ring-like beam to illuminate an object, a ring-like light polarizing element positioned to plane polarize said beam before it impinges upon said object, said polarizing element being of such shape as to provide a central aperture therein, and a second polarizing element positioned to intersect beams traversing said ring-like polarizing element and reflected from said object through said aperture and having its polarizing axis so positioned with respect to the polarizing axis of said first mentioned polarizing element as to change the ratio of the intensity of the depolarized portion of the reflected light to the intensity of the non-depolarized portion thereof.

4. An attachment for dark field opaque illuminators comprising a thin ring-like sheet polarizing element, adapted to plane polarize the light illuminating an object, and means cooperating therewith and comprising a light polarizing element positioned to intercept beams reflected from the object through an aperture in said ring-like polarizing element to an eye piece said last mentioned polarizing element being positioned with its polarizing axis at right angles to the polarizing axis of said ring-like polarizing element.

5. In combination a thin sheet-like polarizer having an aperture therein, means to direct a beam of light through said polarizer and means thereafter to reflect said beam to cause it to traverse said aperture, and an analyzer positioned to intercept said reflected beam.

6. In combination a thin sheet-like polarizer, having an aperture therein and a thin, sheet-like analyzer in the same plane as said polarizer and means to cause a beam of light to traverse said sheet-like polarizer, to be reflected from an object, and then to traverse said analyzer.

EDWIN H. LAND.